(12) United States Patent
Shi et al.

(10) Patent No.: US 12,452,949 B2
(45) Date of Patent: Oct. 21, 2025

(54) METHOD AND DEVICE FOR TRANSMITTING AND RECEIVING DATA IN INACTIVE STATE, AND USER EQUIPMENT

(71) Applicant: GUANGDONG OPPO MOBILE TELECOMMUNICATIONS CORP., LTD., Dongguan (CN)

(72) Inventors: Cong Shi, Dongguan (CN); Xue Lin, Dongguan (CN); Shukun Wang, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 17/959,152

(22) Filed: Oct. 3, 2022

(65) Prior Publication Data
US 2023/0038013 A1 Feb. 9, 2023

Related U.S. Application Data

(63) Continuation of application No. PCT/CN2020/083607, filed on Apr. 7, 2020.

(51) Int. Cl.
 *H04W 76/27* (2018.01)
 *H04W 52/02* (2009.01)
 *H04W 76/28* (2018.01)

(52) U.S. Cl.
 CPC ....... *H04W 76/27* (2018.02); *H04W 52/0216* (2013.01); *H04W 76/28* (2018.02)

(58) Field of Classification Search
 None
 See application file for complete search history.

(56) References Cited

U.S. PATENT DOCUMENTS

2018/0192426 A1 7/2018 Ryoo et al.
2018/0270889 A1 9/2018 Leroux et al.
(Continued)

FOREIGN PATENT DOCUMENTS

CN 106714315 A 5/2017
CN 107635271 A 1/2018
(Continued)

OTHER PUBLICATIONS

Oppo, "Discussion on Data transmission in 'Inactive' State", R2-167479, 3GPP TSG-RAN WG2 Meeting #96 Reno, USA Nov. 14-18, 2016.
International Search Report issued in International application No. PCT/CN2020/083607, mailed Dec. 30, 2020.
Written Opinion of the International Searching Authority issued in International application No. PCT/CN2020/083607, mailed Dec. 30, 2020.
(Continued)

Primary Examiner — Jamaal Henson
(74) Attorney, Agent, or Firm — BAYES PLLC

(57) ABSTRACT

The present disclosure discloses a method and device for transmitting and receiving data in an inactive state, and user equipment (UE). The method comprises: UE receiving configuration information from a network side apparatus, the configuration information being used to indicate whether at least one of at least one logical channel and a DRB of the UE supports data transmission in a radio resource control (RRC) inactive state; when the configuration information indicates that the at least one logical channel supports the data transmission in the RRC inactive state, the UE transmitting data to be transmitted of the at least one logical channel; and when the configuration information indicates that the DRB supports the data transmission in the RRC inactive state, transmitting data to be transmitted on a logical channel associated with the DRB.

17 Claims, 4 Drawing Sheets

(56) References Cited

U.S. PATENT DOCUMENTS

| | | | | |
|---|---|---|---|---|
| 2019/0037447 A1* | 1/2019 | Lee | ................... | H04W 74/0833 |
| 2019/0174571 A1* | 6/2019 | Deenoo | ................ | H04W 68/02 |
| 2019/0175471 A1* | 6/2019 | Wadeer | .................... | A61K 8/28 |
| 2019/0281651 A1 | 9/2019 | Lee et al. | | |
| 2020/0229111 A1* | 7/2020 | Kim | ..................... | H04B 17/309 |
| 2021/0298085 A1* | 9/2021 | Lee | ....................... | H04W 72/23 |

FOREIGN PATENT DOCUMENTS

| | | | | |
|---|---|---|---|---|
| CN | 108184214 A | | 6/2018 | |
| EP | 4132204 A1 | | 2/2023 | |
| WO | WO-2020034560 A1 | * | 2/2020 | ............ H04W 76/27 |
| WO | 2020067790 A1 | | 4/2020 | |
| WO | 2020087280 A1 | | 5/2020 | |

OTHER PUBLICATIONS

ZTE Corporation, "Work Item on NR smalldata transmissions in Inactive state", RP-193252, 3GPP TSG RAN Meeting #86 Sitges, Spain, Dec. 9-12, 2019.

3GPP TS 38.331 V17.1.0 (2022-06); Technical Specification Group Radio Access Network; NR; Radio Resource Control (RRC) protocol specification (Release 17).

Extended European Search Report issued in corresponding European application No. 20930318.9, mailed Apr. 11, 2023.

Communication pursuant to Article 94(3) EPC issued in corresponding European Application No. 20930318.9, mailed Jun. 3, 2025, 6 pages.

* cited by examiner

METHOD AND DEVICE FOR TRANSMITTING AND RECEIVING DATA IN INACTIVE STATE, AND USER EQUIPMENT

CROSS-REFERENCE TO RELATED APPLICATION

This application is a continuation of International Application No. PCT/CN2020/083607, filed on Apr. 7, 2020, entitled "METHOD AND DEVICE FOR TRANSMITTING AND RECEIVING DATA IN INACTIVE STATE, AND USER EQUIPMENT", the disclosure of which is incorporated herein by reference in its entirety.

TECHNICAL FIELD

The present disclosure relates to the field of communications, and in particular, to a method and device for transmitting and receiving data in an inactive state, and user equipment.

BACKGROUND

In New Radio (NR for short) scenarios, data transmission is not supported in a Radio Resource Control (RRC) Inactive state. Since service scenarios are more diverse, different services correspond to different Data Radio Bearer (DRB) configurations (that is, different DRBs are used to transmit service types with different QoS requirements). For some types of services, the data arrives irregularly, and the size of the arriving data packets varies greatly, which is not suitable for the inactive state data transmission mode. For other service types, such as heartbeat packets, or some health monitoring data, the size of the data packets is generally small, and thus is more suitable for transmission in the inactive state.

However, in the related art, User Equipment (UE for short) does not support data transmission in an inactive state.

With respect to the above problems, no effective solution has been proposed yet.

SUMMARY

The embodiments of the present disclosure provide a method and device for transmitting and receiving data in an inactive state, and user equipment.

According to an aspect of the embodiments of the present disclosure, a method for transmitting data in an inactive state is provided, including: receiving, by user equipment, configuration information from a network side device, where the configuration information is used to indicate whether at least one of at least one logical channel and a data radio bearer (DRB) of the user equipment supports data transmission in a Radio Resource Control (RRC) inactive state; when the configuration information indicates that the at least one logical channel supports data transmission in the RRC inactive state, transmitting, by the user equipment, data to be transmitted for the at least one logical channel; and when the configuration information indicates that the DRB supports data transmission in the RRC inactive state, transmitting, by the user equipment, data to be transmitted on a logical channel associated with the DRB.

Optionally, the configuration information is further used to indicate whether the user equipment supports data transmission in the RRC inactive state, and the above method further includes: when the configuration information indicates that the user equipment does not support data transmission in the RRC inactive state and the user equipment has data to be transmitted, initiating, by the user equipment, an RRC resume procedure, and transmitting the data to be transmitted when the user equipment resumes a connected state.

Optionally, the receiving, by the user equipment, the configuration information from the network side device includes: receiving, by the user equipment, a radio resource control (RRC) reconfiguration message from the network side device, and obtaining the configuration information from the RRC reconfiguration message.

Optionally, the receiving, by the user equipment, the configuration information from the network side device includes: receiving, by the user equipment, an RRC release message from the network side device, wherein the RRC release message is used to release the user equipment from an RRC connected state to the RRC inactive state; and obtaining the configuration information from the RRC release message.

Optionally, the obtaining the configuration information from the RRC release message includes: obtaining indication information from the release message, where the indication information is used to indicate a DRB that supports data transmission in the RRC inactive state or a logical channel associated with the DRB.

Optionally, the method further includes: when the configuration information indicates that the at least one logical channel does not support data transmission in the RRC inactive state, and the user equipment has data to be transmitted for the DRB corresponding to the at least one logical channel, initiating, by the user equipment, an RRC resume procedure; and transmitting the data to be transmitted when the user equipment resumes a connected state.

Optionally, the at least one logical channel is determined in the following manner determining, by the user equipment from a set of logical channels of the user equipment, the logical channel(s) that has data to be transmitted, and using the logical channel(s) that has data to be transmitted as the at least one logical channel.

Optionally, the at least one logical channel includes multiple logical channels; and transmitting, by the user equipment, the data to be transmitted for the at least one logical channel includes: in the RRC inactive state, determining, by the user equipment based on the configuration information corresponding to each of the multiple logical channels, whether the multiple logical channels support the data transmission in the RRC inactive state; and initiating, by the user equipment, the data transmission in the RRC inactive state when the multiple logical channels all support the data transmission in the RRC inactive state.

Optionally, before initiating, by the user equipment, the data transmission in the RRC inactive state, the method further includes: determining whether a first total data amount of the data to be transmitted for the multiple logical channels is less than a first threshold; initiating, by the user equipment, the data transmission in the RRC inactive state if the first total data amount is less than the first threshold; and initiating, by the user equipment, an RRC resume procedure if the first total data amount is greater than the first threshold.

Optionally, the method further includes: when the at least one logical channel includes multiple logical channels, some logical channels in the multiple logical channels support data transmission in the RRC inactive state, and the remaining logical channels do not support data transmission in the RRC inactive state, determining a second total data amount of the data to be transmitted in the multiple logical channels;

and when the second total data amount is not greater than a second threshold, multiplexing, by the user equipment, the data to be transmitted in the multiple logical channels, and initiating, by the user equipment, the data transmission in the RRC inactive state.

Optionally, when the at least one logical channel includes multiple logical channels, some logical channels in the multiple logical channels support data transmission in the RRC inactive state, and the remaining logical channels do not support data transmission in the RRC inactive state, the method further includes: resuming an RRC connected state through an RRC resume procedure by the user equipment by default to initiate data transmission.

Optionally, when the at least one logical channel includes multiple logical channels, some logical channels in the multiple logical channels support data transmission in the RRC inactive state, and the remaining logical channels do not support data transmission in the RRC inactive state, the method further includes: receiving, by the user equipment, control signaling from the network side device, where the control signaling is used to indicate whether data transmission in the RRC inactive state is supported when some logical channels in the multiple logical channels support data transmission in the RRC inactive state and the remaining logical channels do not support data transmission in the RRC inactive state.

According to another aspect of the embodiments of the present disclosure, a method for receiving data in an inactive state is provided, including: transmitting, by a network side device, configuration information to a user equipment, where the configuration information is used to indicate whether at least one of at least one logical channel and a data radio bearer (DRB) of the user equipment supports data transmission in an RRC inactive state; and when the configuration information indicates that the at least one logical channel supports data transmission in the RRC inactive state, receiving, by the network side device, data to be transmitted for the at least one logical channel or data to be transmitted on a logical channel associated with the DRB that is transmitted by the user equipment.

Optionally, the transmitting, by the network side device, the configuration information to the user equipment includes: transmitting, by the network side device, an RRC reconfiguration message to the user equipment, wherein the RRC reconfiguration message carries the configuration information.

Optionally, the transmitting, by the network side device, the configuration information to the user equipment includes: transmitting, by the network side device, an RRC release message to the user equipment, where the RRC release message is used to release the user equipment from an RRC connected state to the RRC inactive state, and the RRC release message carries the configuration information.

Optionally, the configuration information includes indication information, and the indication information is used to indicate a DRB that supports data transmission in the RRC inactive state or a logical channel associated with the DRB.

According to another aspect of the embodiments of the present disclosure, a device for transmitting data in an inactive state is provided, including: a reception module, configured to receive configuration information from a network side device, where the configuration information is used to indicate whether at least one of at least one logical channel and a data radio bearer (DRB) of the user equipment supports data transmission in a Radio Resource Control (RRC) inactive state; a transmission module, configured to transmit data to be transmitted for the at least one logical channel when the configuration information indicates that the at least one logical channel supports data transmission in the RRC inactive state, and to transmit data to be transmitted on a logical channel associated with the DRB when the configuration information indicates that the DRB supports data transmission in the RRC inactive state.

Optionally, the configuration information is further used to indicate whether the user equipment supports data transmission in the RRC inactive state, and the transmission module is further configured to initiate an RRC resume procedure when the configuration information indicates that the user equipment does not support data transmission in the RRC inactive state and the user equipment has data to be transmitted, and to transmit the data to be transmitted when the user equipment resumes a connected state.

Optionally, the reception module is further configured to receive a radio resource control (RRC) reconfiguration message from the network side device, and obtain the configuration information from the RRC reconfiguration message.

Optionally, the reception module is further configured to receive an RRC release message from the network side device, where the RRC release message is used to release the user equipment from an RRC connected state to the RRC inactive state; and obtain the configuration information from the RRC release message.

Optionally, the reception module is further configured to obtain indication information from the release message, where the indication information is used to indicate a DRB that supports data transmission in the RRC inactive state or a logical channel associated with the DRB.

Optionally, the device further includes a resume module configured to initiate an RRC resume procedure when the configuration information indicates that the at least one logical channel does not support data transmission in the RRC inactive state and the user equipment has data to be transmitted for the DRB corresponding to the at least one logical channel; and the transmission module is configured to transmit the data to be transmitted when the user equipment resumes a connected state.

Optionally, the at least one logical channel is determined in the following manner determining, from a set of logical channels of the user equipment, the logical channel(s) that has data to be sent, and using the logical channel(s) that has data to be transmitted as the at least one logical channel.

Optionally, the at least one logical channel includes multiple logical channels, and the transmission module is further configured to, in the RRC inactive state, determine, based on the configuration information corresponding to each of the multiple logical channels, whether the multiple logical channels support data transmission in the RRC inactive state; and to initiate the data transmission in the RRC inactive state when the multiple logical channels all support data transmission in the RRC inactive state.

Optionally, the device further includes: a determination module configured to determine whether a first total data amount of the data to be transmitted for the multiple logical channels is less than a first threshold; and the transmission module is further configured to, initiate the data transmission in the inactive state when the total data amount is less than the first threshold, and to initiate an RRC resume procedure when the first total data amount is greater than the first threshold.

Optionally, the device further includes: a determination module, configured to determine a second total data amount of the data to be transmitted in the multiple logical channels when the at least one logical channel includes multiple logical channels, some logical channels in the multiple logical channels support data transmission in the RRC inactive state, and the remaining logical channels do not support data transmission in the RRC inactive state; and the transmission module is further configured to multiplex the data to be transmitted in the multiple logical channels and initiate the data transmission in the RRC inactive state when the second total data amount is not greater than a second threshold.

Optionally, the transmission module is further configured to resume an RRC connected state through an RRC resume procedure by default to initiate data transmission when the at least one logical channel includes multiple logical channels, some logical channels in the multiple logical channels support data transmission in the RRC inactive state, and the remaining logical channels do not support data transmission in the RRC inactive state.

Optionally, the reception module is further configured to receiving control signaling from the network side device when the at least one logical channel includes multiple logical channels, some logical channels in the multiple logical channels support data transmission in the RRC inactive state, and the remaining logical channels do not support data transmission in the RRC inactive state, where the control signaling is used to indicate whether data transmission in the RRC inactive state is supported when some logical channels in the multiple logical channels support data transmission in the RRC inactive state and the remaining logical channels do not support data transmission in the RRC inactive state.

According to another aspect of the embodiments of the present disclosure, a device for receiving data in an inactive state is provided, including: a transmission module, configured to transmit configuration information to a user equipment, where the configuration information is used to indicate whether at least one of at least one logical channel and a data radio bearer (DRB) of the user equipment supports data transmission in an RRC inactive state; and a reception module configured to receive data to be transmitted for the at least one logical channel or data to be transmitted on a logical channel associated with the DRB that is transmitted by the user equipment when the configuration information indicates that the at least one logical channel supports data transmission in the RRC inactive state.

Optionally, the transmission module is further configured to send an RRC reconfiguration message to the user equipment, wherein the RRC reconfiguration message carries the configuration information.

Optionally, the transmission module is further configured to send an RRC release message to the user equipment, wherein the RRC release message is used to release the user equipment from an RRC connected state to the RRC inactive state, and the RRC release message carries the configuration information.

Optionally, the configuration information includes indication information, and the indication information is used to indicate a DRB that supports data transmission in the RRC inactive state or a logical channel associated with the DRB.

According to another aspect of the embodiments of the present disclosure, a user equipment is provided, including: a transceiver circuit, configured to receive configuration information from a network side device, where the configuration information is used to indicate whether at least one of at least one logical channel and a data radio bearer (DRB) of the user equipment supports data transmission in a Radio Resource Control (RRC) inactive state; and a processor, configured to transmit data to be transmitted for the at least one logical channel when the configuration information indicates that the at least one logical channel supports data transmission in the RRC inactive state, and notify the transceiver circuit to transmit data to be transmitted on a logical channel associated with the DRB when the configuration information indicates that the DRB supports data transmission in the RRC inactive state.

According to another aspect of the embodiments of the present disclosure, a network side device is provided, including: a processor, configured to determine configuration information to be transmitted to a user equipment, where the configuration information is used to indicate whether at least one of at least one logical channel and a data radio bearer (DRB) of the user equipment supports data transmission in an RRC inactive state; and a transceiver circuit configured to receive data to be transmitted for the at least one logical channel or data to be transmitted on a logical channel associated with the DRB that is transmitted by the user equipment when the configuration information indicates that the at least one logical channel supports data transmission in the RRC inactive state.

According to yet another aspect of the embodiments of the present disclosure, a non-volatile storage medium is provided, and the non-volatile storage medium is configured to store a program which, when running in a device where the non-volatile storage medium is located, executes the method for transmitting data in the inactive state as described above.

According to yet another aspect of the embodiments of the present disclosure, a processor is provided, the processor is configured to run a program stored in a memory, and the program is configured to execute the method for transmitting data in the inactive state as described above.

BRIEF DESCRIPTION OF THE DRAWINGS

The drawings described here are used to provide a further understanding of the present disclosure and constitute a part of the disclosure. The exemplary embodiments and description of the disclosure are used to explain the disclosure, and do not constitute an improper limitation of the disclosure. In the drawings.

DETAILED DESCRIPTION

Figure 1:
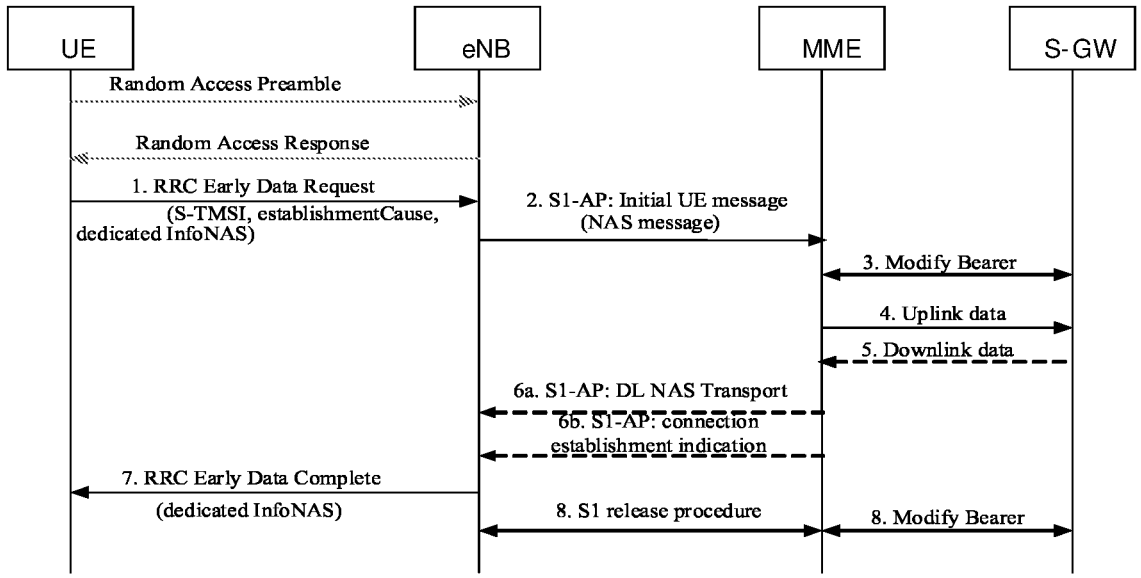
FIG. 1 is a schematic diagram of a transmission flow of control plane early data transmission (CP-EDT) data according to the related art.

In order to make those skilled in the art better understand the solutions of the present disclosure, the technical solutions in the embodiments of the present disclosure will be clearly and completely described below with reference to the accompanying drawings in the embodiments of the present disclosure. Obviously, the described embodiments are only part but not all of embodiments of the present disclosure. All other embodiments obtained by those of ordinary skill in the art based on the embodiments in the present disclosure without creative work shall fall within the protection scope of the present disclosure.

It is to be noted that the terms "first", "second", etc. in the description, claims, and the above drawings of the present disclosure are used to distinguish between similar objects, and are not necessarily used to describe a specific sequence or order. It should be understood that the data used in this way can be interchanged under appropriate circumstances, so that the embodiments of the present disclosure described herein can be implemented in a sequence other than those illustrated or described herein. In addition, the terms "include" and "have" and any variations thereof are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

In order to facilitate the understanding of the embodiments of the present disclosure, some technical contents involved in the embodiments of the present disclosure are described as follows.

One of the projects of 3GPP R17 is about small data transmission optimization (RP-193252), which proposes the need to support small data transmission by UE in an RRC inactive state, and the main purpose is to save power and signaling overhead. Specific project goals include:

1) Optimization of small data transmission based on Random Access Channel (RACH for short), including a 4-step RACH procedure and a 2-step RACH procedure; and 2) Optimization of small data transmission based on type1 configured grant, which means that Type1 CG transmission needs to be supported in the RRC inactive state.

Regarding different RRC states and transition between the states in the NR protocol:

In the 5G network environment, in order to reduce air interface signaling, quickly resume wireless connections, and quickly resume data services, a new RRC state, i.e., an RRC_INACTIVE state, is defined. This state is different from RRC_IDLE and RRC_ACTIVE states, in which:

RRC_IDLE: Mobility is based on cell selection and reselection, paging is initiated by a core network (CN for short), and a paging area is configured by the CN. There is no UE Access Stratum (AS for short) context and no RRC connection on the base station side.

RRC_INACTIVE: Mobility is based on cell selection and reselection. In this state, there is a CN-NR connection, the UE AS context exists on a certain base station, and paging is triggered by a Radio Access Network (RAN). The RAN-based paging area is managed by the RAN, and the network side knows the location of the UE based on the paging area level of the RAN.

RRC_CONNECTED: there is RRC connection, and there is UE AS context in the base station and the UE. The network side knows the location of the UE in a specific cell level. Mobility is the mobility controlled by the network side. Unicast data can be transmitted between the UE and the base station.

The network side can control the switching of the UE between different states. Some RRC parameters on the UE side in the RRC inactive state are configured through an RRC Release message, in which an I-RNTI is used to identify the UE inactive context on the base station side and is unique in the base station, an RNA (RAN Notification Area) is used to control the area where the UE performs cell selection and reselection in the inactive state, which is also the paging range area for the initial paging of the RAN, an RAN paging cycle is used to calculate paging occasions of the RAN initial paging, and a NCC is used for the key used in an RRC connection resume procedure.

When the UE moves within the RNA area, it does not need to notify the network side, and follows the mobility behavior in the idle state, that is, the principle of cell selection and reselection. When the UE moves out of the paging area configured by the RAN, the UE triggers a procedure for resuming the RRC connection, that is, an RRC resume procedure, and re-acquires the paging area configured by the RAN. When the network side needs to transmit data to the UE, that is, when downlink data arrives, the gNB that saves the UE context will trigger all cells in the RAN paging area to send a paging message to the UE, so that the UE in the Inactive state can resume the RRC connection and perform data reception. In addition, the UE in the Inactive state is configured with a RAN paging area. In this area, in order to ensure the accessibility of the UE, the UE needs to perform periodic location update according to the period configured by the network. Scenarios in which the UE is triggered to perform RNA update include that an RAN Notification Area Update (RNAU) timer times out or the UE moves to an area outside the RNA. At present, the RRC Inactive state defined by NR does not support user plane data transmission by the UE.

Optimization of Small Data Transmission in IDLE State in LTE:

The process of small data transmission is defined in LTE, that is, Early Data Transmission (EDT), which is mainly for NB-IoT UEs and Emtc UEs. When the data initiated by the terminal arrives and the data is smaller than a data threshold broadcast by the system, the UE can trigger EDT based on the RACH. EDT mainly includes the user plane EDT (UP-EDT) and the control plane EDT (CP-EDT).

Figure 2:
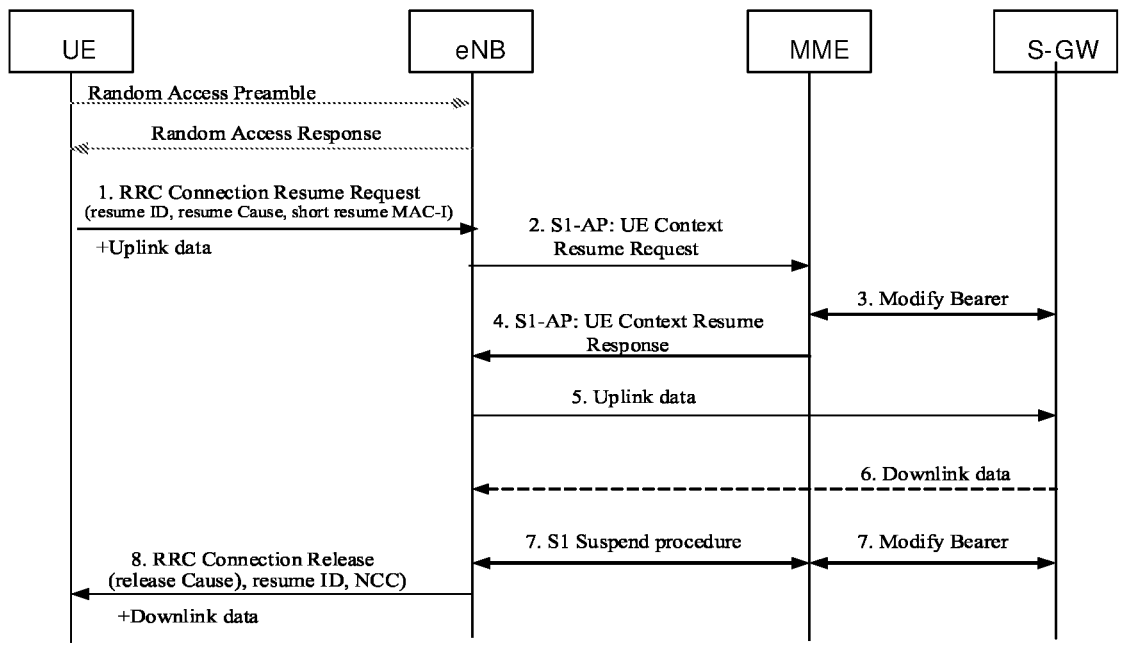
FIG. 2 is a schematic diagram of a transmission flow of user plane early data transmission (UP-EDT) data according to the related art.

As shown in FIG. 1, CP-EDT data is mainly transmitted through a NAS message; and as shown in FIG. 2, UP-EDT data is mainly transmitted by multiplexing user plane data into an RRC message for transmission.

In the LTE protocol, for the EDT mechanism, the network side broadcasts, in a system broadcast message, a maximum size of the small data transmission that the cell can support. When the UE has data to be transmitted, if the size of the data to be transmitted is smaller than the supported maximum data size that is broadcasted, the UE initiates an EDT procedure. However, in NR scenarios, due to the diversity of service scenarios, different services are reflected in different DRB configurations (different DRBs are used to transmit service types with different QoS requirements). For some types of services, the data arrives irregularly, and the size of the arriving data packets varies greatly, which is not suitable for the small data transmission mode in the inactive state. For some other service types, such as heartbeat packets, or some health monitoring data, the size of the data packets is generally small, so it is more suitable for transmission in the inactive state. However, in the current NR scenarios, data transmission in the inactive state is not supported.

In order to solve the above technical problems, the embodiments of the present disclosure provide corresponding solutions. The UE receives a network configuration message, and the configuration message can configure whether different DRBs support small data transmission; the UE decides whether to initiate small data transmission in the RRC Inactive state according to parameter configuration of different DRBs; when there is data to be transmitted for a certain logical channel of the UE in the RRC Inactive state, the UE determines whether the DRB supports small data transmission in the RRC Inactive state, that is, whether an indication parameter is configured. If the logical channel supports small data transmission, the UE initiates small data transmission in the RRC Inactive state. If the DRB that has data to be transmitted does not support small data transmission, the UE initiates an RRC resume procedure, and when the network resumes the UE to a connected state, the UE can directly transmit the data. The network configuration message may be an RRC reconfiguration message in the connected state, or an RRC release message. The parameter configuration of the DRB may be the configuration of the logical channel associated the DRB. The detailed description is provided below with reference to the embodiments.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, or the like.

Figure 3:
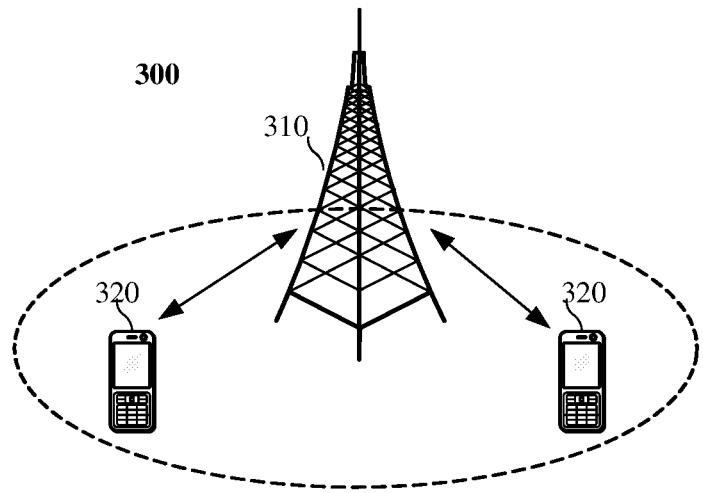
FIG. 3 is a schematic structural diagram of a communication system according to an embodiment of the present disclosure.

For example, a communication system 300 to which the embodiments of the present disclosure are applied is as shown in FIG. 3. The communication system 300 may include a network device 310 which may be a device that communicates with a user equipment 320 (or referred to as a communication terminal or a terminal). The network device 310 can provide communication coverage for a specific geographic area, and can communicate with user equipment located in the coverage area. Optionally, the network device 310 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 300 also includes at least one user equipment 320 located within the coverage range of the network device 310. As used herein, the user equipment includes, but is not limited to, a device configured to receive/send communication signals, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter; and/or an Internet of Things (IoT) device. The user equipment configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, user equipment in 5G networks, user equipment in the future evolution of PLMN, or the like.

Optionally, Device to Device (D2D) communication may be performed between the user equipments 320.

Optionally, the 5G system or 5G network may also be referred to as a New Radio (NR) system or NR network.

FIG. 3 exemplarily shows one network device and two user equipments. Optionally, the communication system 100 may include multiple network devices and other numbers of user equipments can be included in the coverage of each network device, which is not particularly limited in the embodiments of the present disclosure.

Optionally, the communication system 300 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 300 shown in FIG. 3 as an example, the communication device may include a network device 310 and a user equipment 320 which have the communication function. The network device 310 and the user equipment 320 may be the specific devices as described above, which will not be repeated here. The communication device may also include other devices in the communication system 300, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

Figure 4:
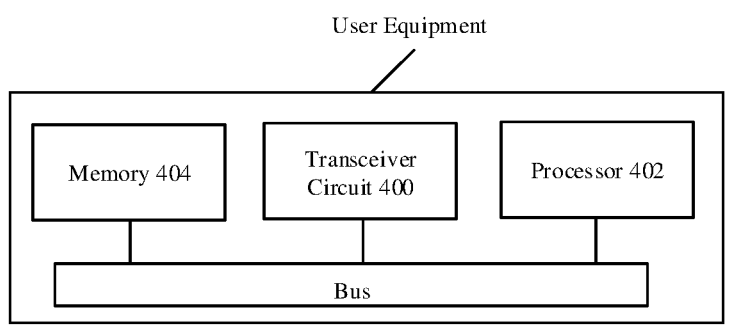
FIG. 4 is a schematic structural diagram of a user equipment according to an embodiment of the present disclosure.

As shown in FIG. 4, the user equipment 320 provided in an embodiment of the present disclosure includes, but is not limited to: a transceiver circuit 400, configured to receive configuration information from a network side device, where the configuration information is used to indicate whether at least one of at least one logical channel and a data radio bearer (DRB) of the user equipment supports data transmission in an RRC inactive state; and a processor 402 configured to transmit data to be transmitted on the at least one logical channel when the configuration information indicates that the at least one logical channel supports data transmission in the RRC inactive state; and notify the transceiver circuit 400 to transmit data to be transmitted on a logical channel associated with the DRB when the configuration information indicates that the DRB supports data transmission in the RRC inactive state. The user equipment may also include hardware components such as a memory 404.

Figure 5:
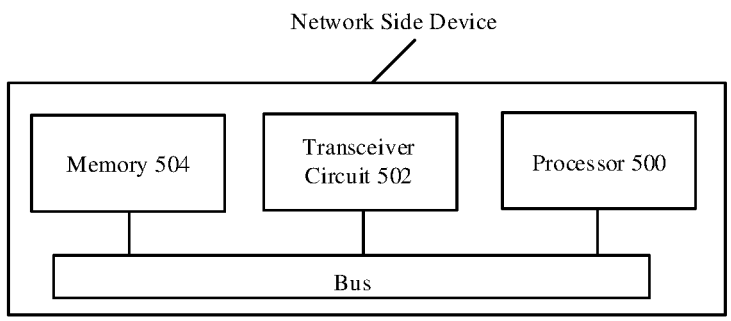
FIG. 5 is a schematic structural diagram of a network side device according to an embodiment of the present disclosure.

As shown in FIG. 5, a network side device 310 provided in an embodiment of the present disclosure includes: a processor 500, configured to determine configuration information to be transmitted to a user equipment, where the configuration information is used to indicate whether at least one of at least one logical channel and a data radio bearer (DRB) of the user equipment supports data transmission in an RRC inactive state; and a transceiver circuit 502 configured to receive data to be transmitted for the at least one logical channel or data to be transmitted on a logical channel associated with the DRB that is transmitted by the user equipment when the configuration information indicates that the at least one logical channel supports data transmission in the RRC inactive state. Hardware components such as a memory 504 can also be included.

In the above operating environment, the embodiments of the present disclosure provide a method embodiment of a method for data transmission in an inactive state. It should be noted that the steps shown in the flowcharts of the accompanying drawings can be executed in a computer system such as a set of computer executable instructions, and although a logical order is shown in the flowcharts, in some cases the steps as shown or described may be performed in an order different from those shown or described herein.

Figure 6:
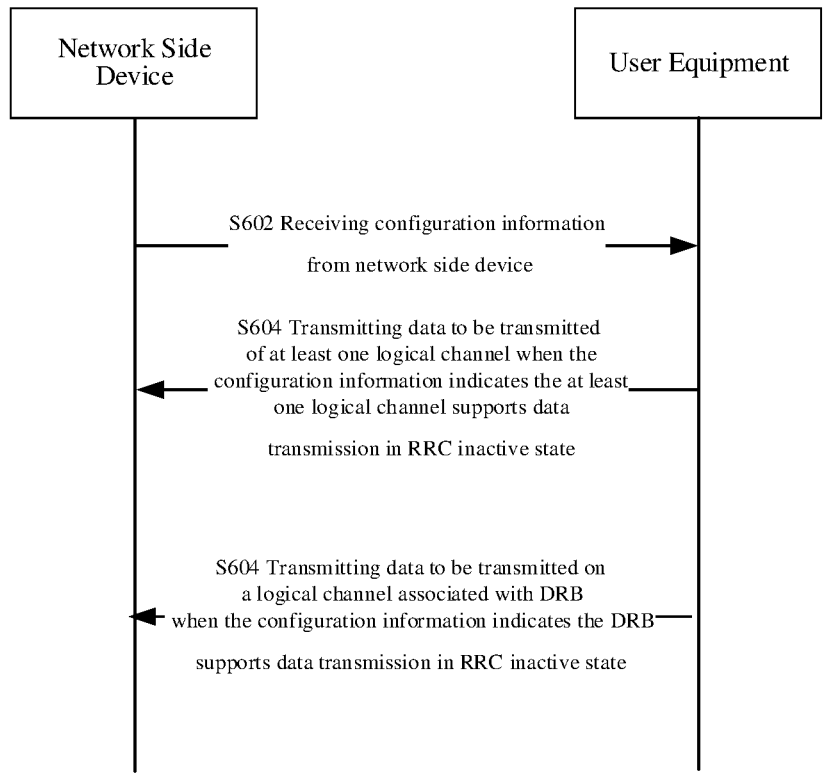
FIG. 6 is a flowchart of a method for data transmission in an inactive state according to an embodiment of the present disclosure.

FIG. 6 shows a data transmission method in an inactive state according to an embodiment of the present disclosure. As shown in FIG. 6, the method includes the following steps.

In step S602, the user equipment receives configuration information from a network side device, where the configuration information is used to indicate whether at least one of at least one logical channel and a DRB of the user equipment supports data transmission in the RRC inactive state.

In step S604, when the configuration information indicates that the at least one logical channel supports data transmission in the RRC inactive state, the user equipment transmits data to be transmitted of the at least one logical channel; and when the configuration information indicates that the DRB supports data transmission in the RRC inactive state, the user equipment transmits data to be transmitted on a logical channel associated with the DRB.

In some embodiment of the present disclosure, the configuration information is further used to indicate whether the user equipment supports data transmission in the RRC inactive state, and in this case, when the configuration information indicates that the user equipment does not support data transmission in the RRC inactive state and the user equipment has data to be transmitted, the user equipment initiates an RRC resume procedure, and transmits the data to be transmitted when the user equipment resumes a connected state.

In the embodiments of the present disclosure, the user equipment can determine whether to support data transmission in the RRC Inactive state in two cases: 1) determine whether data transmission needs to be performed in the RRC Inactive state based on connected state logical channel configuration; and 2) configure a small data transmission DRB based on an RRC release message.

For the case 1), the user equipment receives an RRC reconfiguration message from the network side device, and obtains the configuration information from the RRC reconfiguration message.

For the case 2), the user equipment receives the RRC release message from the network side device, the RRC release message is used to release the user equipment from an RRC connected state to the RRC inactive state; and the user equipment obtains the configuration information from the RRC release message. The user equipment obtains indication information from the release message, where the indication information is used to indicate a DRB that supports data transmission in the RRC inactive state or a logical channel associated with the DRB.

When the configuration information indicates that the at least one logical channel does not support data transmission in the RRC inactive state, and the user equipment has data to be transmitted for the DRB corresponding to the at least one logical channel, the user equipment initiates an RRC resume procedure; and transmits the data to be transmitted when the user equipment resumes a connected state.

In some embodiments of the present disclosure, the above-mentioned at least one logical channel is determined in the following manner the user equipment determines, from a set of logical channels of the user equipment, the logical channel(s) that has data to be transmitted, and uses the logical channel(s) that has data to be transmitted as the at least one logical channel.

When the at least one logical channel includes multiple logical channels, in the RRC inactive state, the user equipment determines, based on the configuration information corresponding to each of the multiple logical channels, whether the multiple logical channels support data transmission in the RRC inactive state, and when the multiple logical channels all support data transmission in the RRC inactive state, the user equipment initiates the data transmission in the RRC inactive state.

In order to ensure the reliability of the communication process, before the user equipment initiates the data transmission in the RRC inactive state, it determines whether a first total data amount of the data to be transmitted for the multiple logical channels is less than a first threshold; if the first total data amount is less than the first threshold, the user equipment initiates the data transmission in the RRC inactive state; and if the first total data amount is greater than the first threshold, the user equipment initiates the RRC resume procedure.

In some other embodiments of the present disclosure, when at least one logical channel includes multiple logical channels, some logical channels in the multiple logical channels support data transmission in the RRC inactive state, and the remaining logical channels do not support data transmission in the RRC inactive state, it determines a second total data amount of the data to be transmitted in the multiple logical channels; and when the second total data amount is not greater than a second threshold, the user equipment multiplexes the data to be transmitted in the multiple logical channels and initiates the data transmission in the RRC inactive state.

Optionally, when the at least one logical channel includes multiple logical channels, some logical channels in the multiple logical channels support data transmission in the RRC inactive state, and the remaining logical channels do not support data transmission in the RRC inactive state, the user equipment resumes an RRC connected state through an RRC resume procedure by default to initiate the data transmission.

Optionally, when the at least one logical channel includes multiple logical channels, some logical channels in the multiple logical channels support data transmission in the RRC inactive state, and the remaining logical channels do not support data transmission in the RRC inactive state, the user equipment receives control signaling from the network side device, where the control signaling is used to indicate whether the data transmission in the RRC inactive state is supported when some logical channels in the multiple logical channels support data transmission in the RRC inactive state and the remaining logical channels do not support data transmission in the RRC inactive state. The above-mentioned control signaling may be configured in the RRC release message, or may be configured in a certain logical channel.

The above-mentioned cases 1) and 2) will be described below with reference to specific logical channels.

For the case 1), that is, determining based on the connected state logical channel configuration whether small data transmission needs to be performed in the RRC Inactive state The UE has different DRBs based on the network configuration, and different DRBs are associated with different logical channels. A parameter is configured in each of the logical channels to indicate whether the data of the logical channel can be permitted to be transmitted in the RRC Inactive state, for example:

| | |
|---|---|
| Logical Channel #1 | can be transmitted in RRC Inactive state |
| Logical Channel #2 | cannot be transmitted in RRC Inactive state |
| Logical Channel #3 | can be transmitted in RRC Inactive state |

When the UE in the RRC Inactive state has data to be transmitted, it first determines the configuration parameter of the logical channel corresponding to the data to be transmitted, that is, whether the data of the logical channel is permitted to be transmitted in the RRC Inactive state.

If there is data to be transmitted on logical channel #1, or logical channel #3, or logical channels #1 and #2, the UE initiates small data transmission based on the configuration of the RRC Inactive state.

If there is data to be transmitted on logical channel #2, the UE initiates an RRC resume procedure, that is, resuming the RRC connected state, to initiate data transmission.

A configuration manner of the above-mentioned logical channel is as follows: configuring a "Boolean" parameter to indicate whether the logical channel can be permitted to be transmitted in the RRC Inactive state.

If there is data to be transmitted in both logical channel #1 and logical channel #2, that is, there are both "can be transmitted in RRC Inactive state" case and "cannot be transmitted in RRC Inactive state" case, the UE can decide whether it needs to transmit data in the RRC Inactive state in the following manner.

If a total size of data of logical channel #1 and logical channel #2 does not exceed a maximum size of small data indicated by the cell, the UE multiplexes the data of logical channel #1 and logical channel #2 for transmission in the RRC Inactive state. Or, in this case, the UE defaults to initiate data transmission through the RRC resume procedure, that is, resuming the RRC connected state.

The network side device can configure a signaling to indicate whether the UE can transmit data in the RRC Inactive state in this case; and the signaling can be configured in the RRC release message, or configured in a certain logical channel, for example, in logical channel #2.

Based on the configuration of each logical channel by the network side, the UE can know for which logical channels that have data to be transmitted, it can use the small data transmission in the RRC Inactive state, that is, it needs not to resume the RRC connected state.

For the case 2), that is, configuring the DRB for small data transmission through the RRC release procedure When the UE receives the RRC Release message from the network side to release the UE to the RRC Inactive state, a DRB for transmitting small data is also configured in the RRC Release message, and the DRB is associated with a logical channel; for example:

| | |
|---|---|
| Logical Channel #1 | associated DRB configured in RRC connected state |
| Logical Channel #2 | associated DRB configured in RRC connected state |
| Logical Channel #3 | associated DRB configured in RRC connected state |
| Logical Channel #4 | associated DRB configured in RRC release |

The UE can initiate small data transmission in the RRC Inactive state only when there is data to be transmitted in logical channel #4.

If the UE does not receive the configuration of the DRB when it is released to the RRC Inactive state by the network, the UE does not support data transmission in the RRC Inactive state.

For other logical channels, if there is data to be transmitted, the UE initiates the RRC resume procedure, and then initiates data transmission when it resumes the RRC connected state.

If there is data to be transmitted in both logical channel #3 and logical channel #4, that is, there are both "can be transmitted in RRC Inactive state" case and "cannot be transmitted in RRC Inactive state" case, the UE can decide whether it needs to transmit data in the RRC Inactive state in the following manner.

When a total size of data of logical channel #3 and logical channel #4 does not exceed a maximum size of small data indicated by the cell, the UE multiplexes the data of logical channel #3 and logical channel #4 for transmission in the RRC Inactive state. Or, by default, the UE initiates data transmission through the RRC resume procedure in this case, that is, resuming the RRC connected state.

The network can configure a signaling to indicate whether the UE can transmit data in the RRC Inactive state in this case; and the signaling can be configured in the RRC release message, or configured in a certain logical channel, for example, in logical channel #2.

In the case 2), the network side does not configure whether each logical channel can be transmitted in the RRC Inactive state, but configures a DRB when releasing the UE to the RRC Inactive state, where the DRB is used to carry small data, that is, only when there is data to be transmitted in the DRB, the UE performs small data transmission in the RRC Inactive state.

Figure 7:
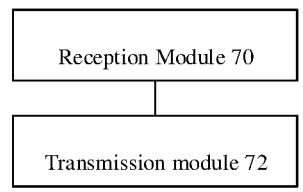
FIG. 7 is a structural diagram of a device for data transmission in an inactive state according to an embodiment of the present disclosure.

The embodiments of the present disclosure also provides a device for data transmission in an inactive state. As shown in FIG. 7, the device includes: a reception module 70, configured to receive configuration information from a network side device, where the configuration information is used to indicate whether at least one of at least one logical channel and a data radio bearer (DRB) of the user equipment supports data transmission in a Radio Resource Control (RRC) inactive state; and a transmission module 72, configured to transmit data to be transmitted for the at least one logical channel when the configuration information indicates that the at least one logical channel supports data transmission in the RRC inactive state, and to transmit data to be transmitted on a logical channel associated with the DRB when the configuration information indicates that the DRB supports data transmission in the RRC inactive state.

Optionally, the configuration information is further used to indicate whether the user equipment supports data transmission in the RRC inactive state, and the transmission module is further configured to initiate an RRC resume procedure when the configuration information indicates that the user equipment does not support data transmission in the RRC inactive state and the user equipment has data to be transmitted, and to transmit the data to be transmitted when the user equipment resumes a connected state.

Optionally, the reception module 70 is further configured to receive a radio resource control (RRC) reconfiguration message from the network side device, and obtain the configuration information from the RRC reconfiguration message.

Optionally, the reception module 70 is further configured to receive an RRC release message from the network side device, where the RRC release message is used to release the user equipment from an RRC connected state to the RRC inactive state; and to obtain the configuration information from the RRC release message.

Optionally, the reception module 70 is further configured to obtain indication information from the release message, where the indication information is used to indicate a DRB that supports data transmission in the RRC inactive state or a logical channel associated with the DRB.

Figure 8:
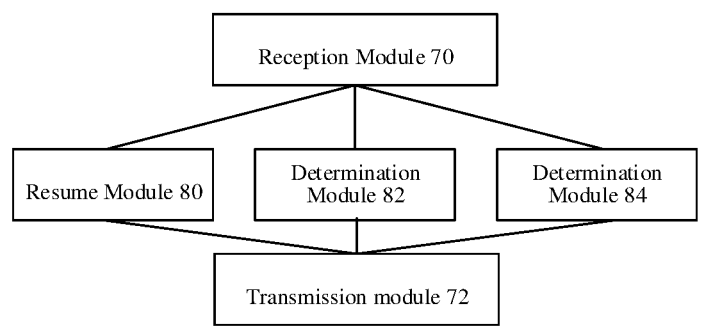
FIG. 8 is a structural diagram of another optional device for data transmission in an inactive state according to an embodiment of the present disclosure.

Optionally, as shown in FIG. 8, the device further includes a resume module 80, configured to initiate an RRC resume procedure when the configuration information indicates that the at least one logical channel does not support data transmission in the RRC inactive state and the user equipment has data to be transmitted for the DRB corresponding to the at least one logical channel; and the transmission module 72 is configured to transmit the data to be transmitted when the user equipment resumes a connected state.

Optionally, the at least one logical channel is determined in the following manner determining, from a set of logical channels of the user equipment, the logical channel(s) that has data to be transmitted, and using the logical channel(s) that has data to be transmitted as the at least one logical channel.

Optionally, the at least one logical channel includes multiple logical channels, and the transmission module 72 is further configured to, in the RRC inactive state, determine, by the user equipment based on the configuration information corresponding to each of the multiple logical channels, whether the multiple logical channels support data transmission in the RRC inactive state, and to initiate the data transmission in the RRC inactive state when the multiple logical channels all support data transmission in the RRC inactive state.

Optionally, as shown in FIG. 8, the above device further includes: a determination module 82 configured to determine whether a first total data amount of the data to be transmitted for the multiple logical channels is less than a first threshold; and the transmission module 72 is further configured to initiate the data transmission in the inactive state when the total data amount is less than the first threshold, and to initiate an RRC resume procedure when the first total data amount is greater than the first threshold.

Optionally, as shown in FIG. 8, the device further includes: a determination module 84, configured to determine a second total data amount of the data to be transmitted in the multiple logical channels when the at least one logical channel includes multiple logical channels, some logical channels in the multiple logical channels support data transmission in the RRC inactive state, and the remaining logical channels do not support data transmission in the RRC inactive state; and the transmission module 72 is further configured to multiplex the data to be transmitted in the multiple logical channels and initiate the data transmission in the RRC inactive state when the second total data amount is not greater than a second threshold.

Optionally, the transmission module 72 is further configured to resume an RRC connected state through an RRC resume procedure by default to initiate data transmission when the at least one logical channel includes multiple logical channels, some logical channels in the multiple logical channels support data transmission in the RRC inactive state, and the remaining logical channels do not support data transmission in the RRC inactive state.

Optionally, the reception module 70 is further configured to receive control signaling from the network side device when the at least one logical channel includes multiple logical channels, some logical channels in the multiple logical channels support data transmission in the RRC inactive state, and the remaining logical channels do not support data transmission in the RRC inactive state, where the control signaling is used to indicate whether data transmission in the RRC inactive state is supported when some logical channels in the multiple logical channels support data transmission in the RRC inactive state and the remaining logical channels do not support data transmission in the RRC inactive state.

Figure 9:
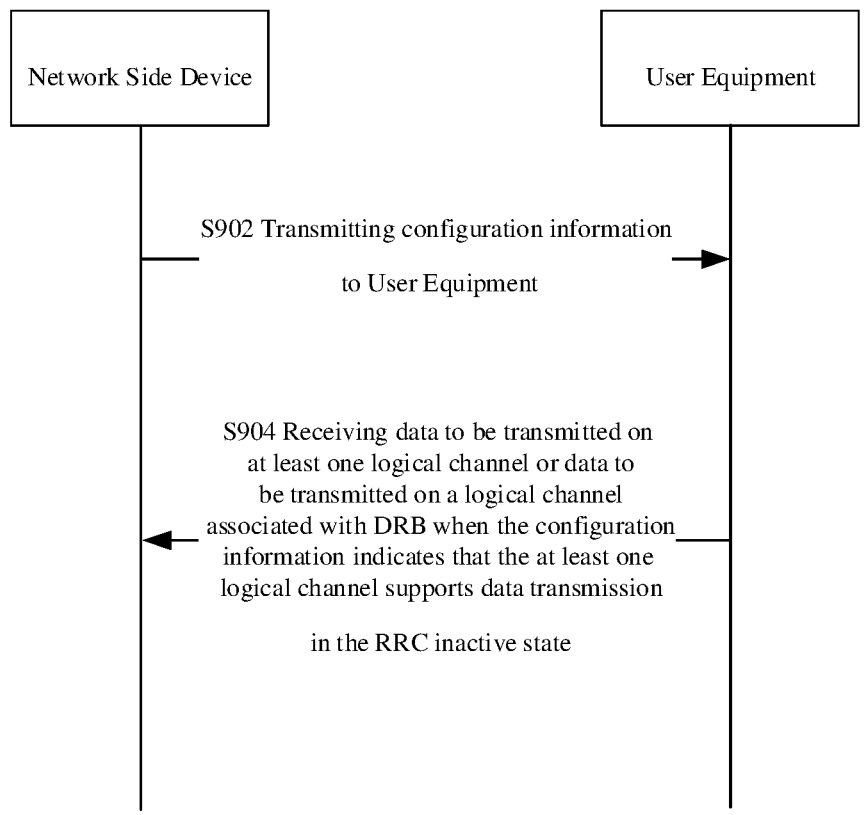
FIG. 9 is a flowchart of a method for data reception in an inactive state according to an embodiment of the present disclosure.

An embodiment of the present disclosure provides a method for data reception in an inactive state. As shown in FIG. 9, the method includes the following.

In step S902, the network side device transmits configuration information to the user equipment, where the configuration information is used to indicate whether at least one of at least one logical channel and a data radio bearer (DRB) of the user equipment supports data transmission in an RRC inactive state.

In step S904, when the configuration information indicates that the at least one logical channel supports data transmission in the RRC inactive state, the network side device receives data to be transmitted on the at least one logical channel or data to be transmitted on a logical channel associated with the DRB, that is transmitted by the user equipment.

In some embodiments of the present disclosure, the network side device may transmit the above configuration information in the following manners: 1) the network side device transmits an RRC reconfiguration message to the user equipment, where the RRC reconfiguration message carries the configuration information; 2) the network side device transmits an RRC release message to the user equipment, where the RRC release message is used to release the user equipment from an RRC connected state to the RRC inactive state, and the RRC release message carries the configuration information.

The above configuration information includes indication information, and the indication information is used to indicate a DRB that supports data transmission in the RRC inactive state or a logical channel associated with the DRB.

Figure 10:
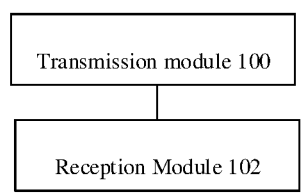
FIG. 10 is a structural diagram of a device for data reception in an inactive state according to an embodiment of the present disclosure.

The embodiments of the present disclosure further provide a device for data reception in an inactive state, and the device is configured to implement the method shown in FIG. 9. As shown in FIG. 10, the device includes a transmission module 100 and a reception module 102.

The transmission module 100 is configured to transmit configuration information to a user equipment, where the configuration information is used to indicate whether at least one of at least one logical channel and a data radio bearer (DRB) of the user equipment supports data transmission in a Radio Resource Control (RRC) inactive state.

The reception module 102 is configured to receive data to be transmitted on the at least one logical channel or data to be transmitted on a logical channel associated with the DRB that is transmitted by the user equipment when the configuration information indicates that at least one logical channel supports data transmission in the RRC inactive state.

Optionally, the transmission module 100 is further configured to send an RRC reconfiguration message to the user equipment, where the RRC reconfiguration message carries the configuration information.

Optionally, the transmission module is further configured to send an RRC release message to the user equipment, where the RRC release message is used to release the user equipment from an RRC connected state to the RRC inactive state, and the RRC release message carries the configuration information.

Optionally, the configuration information includes indication information, and the indication information is used to indicate a DRB that supports data transmission in the RRC inactive state or a logical channel associated with the DRB.

An embodiment of the present disclosure provides a non-volatile storage medium, the storage medium is used to store a program which, when running in a device where the non-volatile storage medium is located, performs the above-mentioned method for data transmission in the inactive state, or the above-mentioned method for data reception in the inactive state.

According to yet another aspect of the embodiments of the present disclosure, there is provided a processor configured to run a program stored in a memory, where the program is configured to execute the above-described method for data transmission in the inactive state, or the above-described method for data reception the inactive state.

In the embodiments of the present disclosure, the user equipment determines whether the logical channels and/or DRBs of the UE support small data transmission based on the configuration information from the network side device, and since the logical channels are often associated with different service types, the solutions in the embodiments of the present disclosure enable the UE to decide whether to transmit the corresponding service data by means of small data transmission according to the configuration by the network, thereby solving the technical problem in the related art that the UE does not support data transmission in the inactive state.

The serial numbers of the foregoing embodiments of the present disclosure are only used for illustration, and do not represent the superiority or inferiority of the embodiments.

In the above embodiments of the present disclosure, the description of each of the embodiments has its own focus, and for the part that is not detailed in any embodiment, reference can be made to the related description of other embodiments.

It should be understood that the technical contents disclosed in several embodiments of the present disclosure can be implemented in other manners. The device embodiments described above are merely illustrative. For example, the division of the units can be a logical function division, and in actual implementations, there can be other division manners. For example, a plurality of units or components can be combined or integrated into another system, or some features can be ignored or not implemented. In addition, the coupling or direct coupling or communication connection as shown or discussed herein can also be indirect coupling or communication connection through some interfaces, units or modules, and can be in electrical or other forms.

The units described as separate components may be or may not be physically separated, and the components shown as units may be or may not be physical units, that is, they may be located in one place or may be distributed over multiple units. Some or all of the units can be selected to achieve the objectives of the solutions of the embodiments according to actual requirements.

In addition, the functional units in the embodiments of the present disclosure may be integrated into one processing unit, or the units may exist physically and separately, or two or more units may be integrated into one unit. The above-mentioned integrated units may be implemented in the form of hardware, or may be implemented in the form of software functional units.

If implemented in the form of software functional unit and sold or used as an independent product, the integrated unit can be stored in a computer-readable storage medium. Based on such understanding, the technical solution of the present disclosure essentially, a part thereof that contributes to the prior art, or a part or all of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a Read-Only Memory (ROM), a Random Access Memory (RAM), a removable hard disk, a magnetic disk or an optical disc that can store program codes.

Those described above are only the preferred embodiments of the present disclosure. It should be noted that improvements and modifications can also be made by those skilled in the art without departing from the principles of the present disclosure, which should also be considered as falling within the protection scope of the present disclosure.

What is claimed is:

1. A method for data transmission in an inactive state, comprising:
    receiving, by a user equipment, configuration information from a network side device, wherein the configuration information is used to indicate whether at least one of at least one logical channel and a data radio bearer (DRB) of the user equipment supports data transmission in a Radio Resource Control (RRC) inactive state;
    transmitting, by the user equipment, data to be transmitted on the at least one logical channel when the configuration information indicates that the at least one logical channel supports data transmission in the RRC inactive state; and transmitting, by the user equipment, data to be transmitted on a logical channel associated with the DRB when the configuration information indicates that the DRB supports data transmission in the RRC inactive state; and initiating, by the user equipment, an RRC resume procedure when the configuration information indicates that the at least one logical channel does not support data transmission in the RRC inactive state and the user equipment has data to be transmitted for the DRB corresponding to the at least one logical channel; and transmitting the data to be transmitted when the user equipment resumes a connected state, wherein the at least one logical channel is determined by:

determining, by the user equipment from a set of logical channels of the user equipment, one or more logical channels that have data to be transmitted, and using the one or more logical channels that have data to be transmitted as the at least one logical channel, and wherein the at least one logical channel is multiple logical channels, and the transmitting, by the user equipment, the data to be transmitted on the at least one logical channel comprises:

in the RRC inactive state, determining, by the user equipment, whether the multiple logical channels support data transmission in the RRC inactive state based on the configuration information corresponding to each of the multiple logical channels; and initiating, by the user equipment, data transmission in the RRC inactive state when the multiple logical channels all support data transmission in the RRC inactive state.

2. The method according to claim 1, wherein the configuration information is further used to indicate whether the user equipment supports data transmission in the RRC inactive state; and the method further comprises:

initiating, by the user equipment, an RRC resume procedure when the configuration information indicates that the user equipment does not support data transmission in the RRC inactive state and the user equipment has data to be transmitted, and transmitting, by the user equipment, the data to be transmitted when the user equipment resumes a connected state.

3. The method according to claim 1, wherein the receiving, by the user equipment, the configuration information from the network side device comprises:

receiving, by the user equipment, a radio resource control (RRC) reconfiguration message from the network side device, and obtaining the configuration information from the RRC reconfiguration message.

4. The method according to claim 1, wherein the receiving, by the user equipment, the configuration information from the network side device comprises:

receiving, by the user equipment, an RRC release message from the network side device, wherein the RRC release message is used to release the user equipment from an RRC connected state to the RRC inactive state; and obtaining the configuration information from the RRC release message.

5. The method according to claim 4, wherein the obtaining the configuration information from the RRC release message comprises:

obtaining indication information from the release message, wherein the indication information is used to indicate a DRB that supports data transmission in the RRC inactive state or a logical channel associated with the DRB.

6. The method according to claim 1, wherein before initiating, by the user equipment, the data transmission in the RRC inactive state, the method further comprises:

determining whether a first total data amount of the data to be transmitted in the multiple logical channels is less than a first threshold; initiating, by the user equipment, the data transmission in the inactive state if the first total data amount is less than the first threshold; and initiating, by the user equipment, an RRC resume procedure if the first total data amount is greater than the first threshold.

7. The method according to claim 1, further comprising:

when the at least one logical channel is multiple logical channels, some logical channels in the multiple logical channels support data transmission in the RRC inactive state, and the remaining logical channels do not support data transmission in the RRC inactive state, determining a second total data amount of the data to be transmitted in the multiple logical channels; and multiplexing the data to be transmitted in the multiple logical channels and initiating data transmission in the RRC inactive state by the user equipment when the second total data amount is not greater than a second threshold.

8. The method according to claim 1, wherein when the at least one logical channel is multiple logical channels, some logical channels in the multiple logical channels support data transmission in the RRC inactive state, and the remaining logical channels do not support data transmission in the RRC inactive state, the method further comprises:

resuming, by the user equipment by default, an RRC connected state through an RRC resume procedure to initiate data transmission.

9. The method according to claim 1, wherein when the at least one logical channel is multiple logical channels, some logical channels in the multiple logical channels support data transmission in the RRC inactive state, and the remaining logical channels do not support data transmission in the RRC inactive state, the method further comprises:

receiving, by the user equipment, control signaling from the network side device, wherein the control signaling is used to indicate whether the data transmission in the RRC inactive state is supported when some logical channels in the multiple logical channels support data transmission in the RRC inactive state and the remaining logical channels do not support data transmission in the RRC inactive state.

10. A method for data reception in an inactive state, comprising:

transmitting, by a network side device, configuration information to a user equipment, wherein the configuration information is used to indicate whether at least one of at least one logical channel and a data radio bearer (DRB) of the user equipment supports data transmission in a Radio Resource Control (RRC) inactive state;

receiving, by the network side device, data to be transmitted on the at least one logical channel or data to be transmitted on a logical channel associated with the DRB that is transmitted by the user equipment when the configuration information indicates that the at least one logical channel supports data transmission in the RRC inactive state; and when the configuration information indicates that the at least one logical channel does not support data transmission in the RRC inactive state and the user equipment has data to be transmitted for the DRB corresponding to the at least one logical channel, receiving, by the network side device, the data to be transmitted for the DRB corresponding to the at least one logical channel that is transmitted by the user equipment in a connected state after the user equipment initiates an RRC resume procedure, wherein the at least one logical channel is one or more logical channels that have data to be transmitted, and when the at least one logical channel is multiple logical channels, the receiving, by the network side device, the data to be transmitted on the at least one logical channel comprises:

receiving, by the network side device, the data transmitted in the RRC inactive state in a case where it is determined that all the multiple logical channels support data transmission in the RRC inactive state based on the configuration information corresponding to each of the multiple logical channels.

11. The method according to claim 10, wherein the transmitting, by the network side device, the configuration information to the user equipment comprises:

transmitting, by the network side device, an RRC reconfiguration message to the user equipment, wherein the RRC reconfiguration message carries the configuration information.

12. The method according to claim 10, wherein the transmitting, by the network side device, the configuration information to the user equipment comprises:

transmitting, by the network side device, an RRC release message to the user equipment, wherein the RRC release message is used to release the user equipment from an RRC connected state to the RRC inactive state, and the RRC release message carries the configuration information.

13. The method according to claim 12, wherein the configuration information comprises indication information, and the indication information is used to indicate a DRB that supports data transmission in the RRC inactive state or a logical channel associated with the DRB.

14. A network side device, comprising:
a transceiver;
a processor; and
a memory configured to store a computer program executable by the processor,
wherein the processor is configured to execute the computer program stored in the memory to cause the network side device to perform the method according to claim 10.

15. A user equipment comprising:
a transceiver circuit, configured to receive configuration information from a network side device, wherein the configuration information is used to indicate whether at least one of at least one logical channel and a data radio bearer (DRB) of the user equipment supports data transmission in a Radio Resource Control (RRC) inactive state; and a processor, configured to transmit data to be transmitted on the at least one logical channel when the configuration information indicates that the at least one logical channel supports data transmission in the RRC inactive state; and to notify the transceiver circuit to transmit data to be transmitted on a logical channel associated with the DRB when the configuration information indicates that the DRB supports data transmission in the RRC inactive state, wherein the processor is further configured to initiate an RRC resume procedure when the configuration information indicates that the at least one logical channel does not support data transmission in the RRC inactive state and the user equipment has data to be transmitted for the DRB corresponding to the at least one logical channel; and transmit the data to be transmitted when the user equipment resumes a connected state, wherein the at least one logical channel is determined by:
determining, by the processor from a set of logical channels of the user equipment, one or more logical channels that have data to be transmitted, and using the one or more logical channels that have data to be transmitted as the at least one logical channel, and wherein the at least one logical channel is multiple logical channels, and the processor is further configured to:
in the RRC inactive state, determine whether the multiple logical channels support data transmission in the RRC inactive state based on the configuration information corresponding to each of the multiple logical channels; and initiate data transmission in the RRC inactive state when the multiple logical channels all support data transmission in the RRC inactive state.

16. The user equipment according to claim 15, wherein the configuration information is further used to indicate whether the user equipment supports data transmission in the RRC inactive state; and the processor is further configured to initiate an RRC resume procedure when the configuration information indicates that the user equipment does not support data transmission in the RRC inactive state and the user equipment has data to be transmitted, and the transceiver circuit is configured to transmit the data to be transmitted when the user equipment resumes a connected state.

17. The user equipment according to claim 15, wherein the transceiver circuit is configured to:
receive a radio resource control (RRC) reconfiguration message from the network side device, and obtain the configuration information from the RRC reconfiguration message.

* * * * *